US011547966B2

(12) United States Patent
Zemmouri

(10) Patent No.: US 11,547,966 B2
(45) Date of Patent: Jan. 10, 2023

(54) DEVICE FOR PRODUCING AND TREATING A GAS STREAM THROUGH AN AUTOMATICALLY CONTROLLED VOLUME OF LIQUID

(71) Applicant: STARKLAB, Nomain (FR)

(72) Inventor: Jaouad Zemmouri, Nomain (FR)

(73) Assignee: STARKLAB, Nomain (FR)

( * ) Notice: Subject to any disclaimer, the term of this patent is extended or adjusted under 35 U.S.C. 154(b) by 258 days.

(21) Appl. No.: 16/483,976

(22) PCT Filed: Feb. 7, 2018

(86) PCT No.: PCT/EP2018/053021
§ 371 (c)(1),
(2) Date: Aug. 6, 2019

(87) PCT Pub. No.: WO2018/146123
PCT Pub. Date: Aug. 16, 2018

(65) Prior Publication Data
US 2020/0009498 A1    Jan. 9, 2020

(30) Foreign Application Priority Data

Feb. 10, 2017  (FR) ...................................... 1751104

(51) Int. Cl.
*B01D 53/14*  (2006.01)
*B01D 53/30*  (2006.01)
(Continued)

(52) U.S. Cl.
CPC ......... *B01D 53/1412* (2013.01); *B01D 53/30* (2013.01); *B01D 53/50* (2013.01);
(Continued)

(58) Field of Classification Search
CPC .... B01D 53/1412; B01D 53/30; B01D 53/50; B01D 53/78; B01D 2257/502; B01D 2257/708; B01J 2219/00177
(Continued)

(56) References Cited

U.S. PATENT DOCUMENTS 4,697,735 A    10/1987  Temple
6,814,841 B2   11/2004  Speranza et al.
(Continued)

FOREIGN PATENT DOCUMENTS

CN    104039993 A    9/2014
CN    105934643 A    9/2016
(Continued)

OTHER PUBLICATIONS

International Search Report dated Apr. 9, 2018 for International Application No. PCT/EP2018/053021 filed Feb. 7, 2018.

*Primary Examiner* — Anita Nassiri-Motlagh
(74) *Attorney, Agent, or Firm* — Blue Filament Law PLLC

(57) ABSTRACT

The device for producing and treating a gas stream (F) includes an exchange enclosure (2) having at least a first discharge opening (2b) for a gas stream, means (3; 4) for supplying the enclosure with a liquid (L), means (3; 5) for discharging the liquid (L) contained in the exchange enclosure (2) and aeraulic means (6), which make it possible, during operation, to create, by means of suction or blowing, an incoming gas stream (F) coming from outside the exchange enclosure (2), so that said incoming gas stream (F) is introduced into the volume of liquid (V) contained in the exchange enclosure (2), and an outgoing gas stream (F'), treated by direct contact with said volume of liquid, rises inside the exchange enclosure and is discharged out of the exchange enclosure (2) through the discharge opening (2b).

15 Claims, 2 Drawing Sheets

(51) Int. Cl.
*B01D 53/78* (2006.01)
*B01D 53/50* (2006.01)

(52) U.S. Cl.
CPC ........ *B01D 53/78* (2013.01); *B01D 2257/502* (2013.01); *B01D 2257/708* (2013.01); *B01J 2219/00177* (2013.01)

(58) Field of Classification Search
USPC ........................................................ 423/220
See application file for complete search history.

(56) References Cited

U.S. PATENT DOCUMENTS

| | | |
|---|---|---|
| 2007/0141366 A1 | 6/2007 | Rivett et al. |
| 2010/0008820 A1* | 1/2010 | Savikko ................. B01D 53/18 422/4 |
| 2010/0016786 A1 | 1/2010 | Drews et al. |
| 2013/0037223 A1* | 2/2013 | Duesel, Jr. ............... B01D 1/30 159/4.01 |
| 2013/0336867 A1* | 12/2013 | Hodotsuka ......... B01D 53/1425 423/220 |
| 2014/0275693 A1* | 9/2014 | Zink .................. B01D 53/1462 585/833 |
| 2015/0145183 A1 | 5/2015 | Matsubara et al. |
| 2016/0071648 A1 | 3/2016 | Dernovsek et al. |
| 2017/0010044 A1 | 1/2017 | Zemmouri |

FOREIGN PATENT DOCUMENTS

| | | |
|---|---|---|
| CN | 205731273 U | 11/2016 |
| DE | 102013205123 A1 | 9/2014 |
| WO | 2006138287 A2 | 12/2006 |
| WO | 2007141366 A2 | 12/2007 |
| WO | 2010016786 A1 | 2/2010 |
| WO | 2015086979 A1 | 6/2015 |
| WO | 2016071648 A2 | 5/2016 |

\* cited by examiner

DEVICE FOR PRODUCING AND TREATING A GAS STREAM THROUGH AN AUTOMATICALLY CONTROLLED VOLUME OF LIQUID

TECHNICAL FIELD

The present invention relates to the production and treatment of gas streams through a volume of liquid with automatic adjustment of the volume of liquid. It is applicable in varied fields, for example, and non-exhaustively, the recovery of calories in a gas stream, and in particular in a hot air stream or in industrial fumes, the production of a gas stream that is heated or cooled upon passing through said volume of liquid, the production of a gas stream whose temperature is controlled and/or whose absolute humidity is controlled, the humidification or dehumidification of a gas stream, the cleanup or filtering of a gas stream, the treatment of a gas stream by chemical reaction with a liquid, the heating or air-conditioning of a site or industrial, service sector or household buildings, or the control of the hygrometry of a site or industrial, service sector or household buildings.

PRIOR ART

The use of a liquid, for example water, to treat, and in particular to heat or cool, a gas stream by heat exchange between the liquid and the gas stream, with placement of the gas stream and the liquid in direct contact, is an old technique, which has the advantage of being eco-friendly, since it in particular avoids using heat transfer fluids of the coolant type. The heating or cooling of the gas stream, and in particular an air stream, can for example be intended to produce a gas stream having a controlled temperature and/or intended to produce a gas stream having a controlled absolute humidity.

A first known solution for carrying out this technique consists in passing the gas stream through a curtain of fine droplets of the liquid or through an exchange surface permeable to the gas and containing the liquid, for example a textile material imbibed with water, or circulating the gas stream in contact with moistened plates. The main drawback of this type of solution lies in the very low energy yield of the heat exchange between the liquid and the gas stream, and in the low air flow rates that can be obtained.

A second known solution consists in passing the gas stream, and in particular the air stream, directly through a volume of liquid contained in an exchange enclosure, by injecting the air stream into the volume of liquid, below the surface of said volume of liquid. This type of solution is described, for example, in international patent application WO 2006/138287 and in U.S. Pat. No. 4,697,735 (FIG. 3). This type of solution is also described in international patent applications WO 2015/086979 and WO2016/071648. This second technical solution has the advantage of allowing a higher energy yield of the heat exchanges between the liquid and the gas stream to be achieved than that in the first technical solution.

In this second technical solution, the exchange between the gas stream and the volume of liquid depends on the height of the liquid through which the gas stream passes. The higher this liquid height, the greater this exchange will be. For example, when the liquid is used to heat or cool a gas stream, the higher the liquid height in the exchange enclosure, the greater the amount of calories exchanged per unit of time between the gas stream and the liquid. When the liquid is used to capture a compound in the gas stream, the higher the liquid height in the exchange enclosure, the greater the amount of this compound captured per unit of time in the liquid.

In some applications, the pressure in the gas stream at the inlet of the exchange enclosure and/or the pressure in the gas stream at the exchange enclosure outlet may vary in an uncontrolled manner, which automatically causes a variation in the height of liquid in the exchange enclosure compensating for this variation in pressure. This variation in the liquid height causes a change in the operating point of the device, the exchange between the gas stream and the volume of liquid in the exchange enclosure being detrimentally modified in an uncontrolled manner.

In some applications, even if the pressure in the gas stream at the inlet of the exchange enclosure and the pressure of the gas stream at the exchange enclosure outlet are constant over time, it may be useful to be able to vary the operating point of the device, and thus to be able to vary the level of exchange between the gas stream and the volume of liquid, for example to make it optimal.

In a more general way, there is a need to automatically adjust the operating point of a device for producing and treating a gas stream by passing said stream through a volume of liquid contained in an exchange enclosure.

OBJECT OF THE INVENTION

One object of the invention is to propose a new technical solution, which makes it possible to produce a gas stream treated by being passed through a liquid contained in an exchange enclosure, and to automatically adjust the operating point of the device.

SUMMARY OF THE INVENTION

The invention thus relates to a device for producing and treating a gas stream, which device comprises an exchange enclosure having at least one first opening for discharging a gas stream, means for supplying the enclosure with a liquid such that the enclosure can contain a volume of this liquid with said first discharge opening of the exchange enclosure being positioned above the surface of the volume of liquid contained in the exchange enclosure, means for discharging the liquid contained in the exchange enclosure and aeraulic means, which are capable, during operation, of creating, by suction or blowing, an incoming gas stream coming from the outside of the exchange enclosure, such that this incoming gas stream is introduced into the volume of liquid contained in the exchange enclosure, below the surface of said volume of liquid, and such that an outgoing gas stream treated by direct contact with said volume of liquid rises up inside the exchange enclosure and is discharged out of said exchange enclosure by passing through the discharge opening of the exchange enclosure.

Characteristically according to the invention, the device further comprises first means for measuring a first operating parameter ($X_{out}$) measured in the outgoing gas stream or first means for measuring a first operating parameter ($X_{out}$) measuring the concentration ($CL_{out}$) of a compound in the liquid contained in the exchange enclosure or coming from the exchange enclosure, or measuring the pH ($pH_{out}$) of the liquid contained in the exchange enclosure or coming from the exchange enclosure, and electronic control means able to automatically control, in particular during operation of the device, the supply means of the exchange enclosure and the discharge means of the exchange enclosure so as to automatically adjust the liquid height (or in other words the level of liquid) in the exchange enclosure depending on at least this first operating parameter ($X_{out}$).

More particularly, but optionally according to the invention, the device of the invention may comprise the additional and optional technical features below, taken individually or in combination and defined according to any of claims 2 to 15.

The invention also relates to the use of at least one device referred to above for producing at least one gas stream that has been treated by being passed through a volume of liquid contained in the exchange enclosure of the device.

More particularly, the invention relates to the use of at least one device referred to above for filtering and/or cleaning up and/or cooling and/or heating an incoming gas stream.

More particularly, the invention relates to the use of at least one device referred to above for treating a stream of an incoming gas stream resulting from combustion or an incoming gas stream containing industrial fumes, and in particular high temperature industrial fumes, or a gas stream containing at least one of the compounds selected from the following list: NOx (nitrogen oxide), VOC (volatile organic compound), SOx (sulfur oxide), PAH (polycyclic aromatic hydrocarbon), CO, $CO_2$, $NH_3$, and chloramine.

BRIEF DESCRIPTION OF THE FIGURES

The features and advantages of the invention will become apparent from reading the detailed description below of several particular embodiments of the invention, which particular embodiments are described as non-limiting and non-exhaustive examples of the invention, and with reference to the accompanying drawings in which.

DETAILED DESCRIPTION

Several examples of devices according to the invention for producing and treating a gas stream will be described in detail below. Said devices can be used in all applications where it is useful to treat a gas stream by passing it through a volume of liquid. Said devices can thus be used in very varied fields, for example, and non-exhaustively, the recovery of calories in a gas stream, and in particular in a hot air stream or in industrial fumes, the production of a gas stream that is heated or cooled upon passing through said volume of liquid, the production of a gas stream whose temperature is controlled and/or whose absolute humidity is controlled, the humidification or dehumidification of a gas stream, the cleanup or filtering of a gas stream, the treatment of a gas stream by chemical reaction(s) with the liquid through which the gas stream has passed, the heating or air-conditioning of a site or industrial, service sector or household buildings, the control of the hygrometry of a site or industrial, service sector or household buildings. The gas stream produced can also be used to cool, heat, humidify or dehumidify any type of object or surface.

Figure 1:
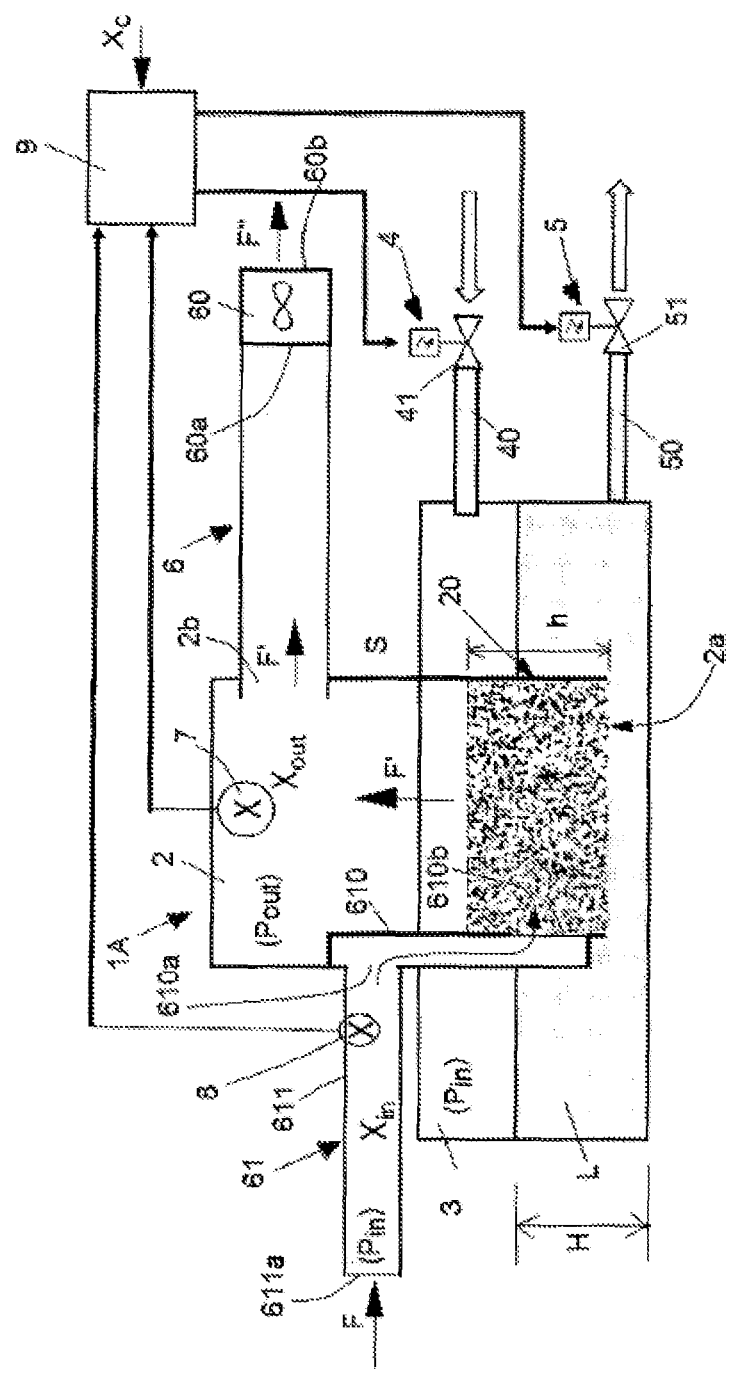
FIG. 1 is a schematic representation of a first device according to the invention.

Referring to the particular embodiment of FIG. 1, the device 1A for producing and treating a gas stream comprises an exchange enclosure 2 and a supply of liquid in the form of a tub 3 containing a liquid bath L, and for example water.

The invention is not limited to the use of water as liquid L, but extends to any other type of liquid. By way of non-limiting and non-exhaustive examples, it may be advantageous to use in certain applications a liquid L whose solidification temperature at atmospheric pressure is less than 0° C., such as, for example, water containing salt, carbohydrate, glycol or alcohol additives. It may also be advantageous to use oil as liquid L.

More particularly, in this variant, of FIG. 1, the tub 3 is closed in an airtight manner such that the liquid bath L contained in the tub 3 is isolated from the external pressure to the exchange enclosure 2, and for example is isolated from the atmospheric pressure when the device 1A is in the open air.

In another variant, the tub 3 may be open so that the volume of liquid outside the exchange enclosures 2 is at atmospheric pressure for example.

The lower face of the bottom 20 of each exchange enclosure 2 is open and thus forms a liquid intake opening 2a. The bottom 20 of each exchange enclosure 2 is positioned in the tub 3 so that by filling the tub 3 with a sufficient level of liquid, the bottom 20 of each exchange enclosure 2 is submerged in the liquid bath contained in the tub 3, and the submerged part of each exchange enclosure 2 contains a volume V of liquid.

The exchange enclosure 2 comprises in its top at least one discharge opening 2b of a gas stream, which opening is positioned above the volume V of liquid contained in the exchange enclosure 2.

For the supply of new liquid to the tub 3, the device 1A further comprises new liquid supply means 4 comprising a liquid supply conduit 40 which opens into the tub 3, above the liquid bath, and which is equipped with a supply valve 41 for controlling the supply of new liquid to the tub 3. In this variant, the tub 3 and the means 4 for supplying the tub 3 with liquid form liquid supply means for the exchange enclosure 2.

The device 1A further comprises discharge means 5 having a discharge conduit 50 which is in communication, at the bottom, with the inside of the tub 3, below the surface of the liquid bath contained in the tub 3, and which is equipped with a discharge valve 51 for controlling the discharge of the liquid out of the tub 3. In this variant, the tub 3 and the discharge means 5 form means for discharging the liquid contained in the exchange enclosure 2.

In another embodiment (not shown), and as described for example in international patent application WO2015/086979, the bottom of the exchange enclosure may not be submerged in a tub 3, but said enclosure may be closed at the bottom and be supplied directly with liquid by means of a pipe without using a tub 3.

The device 1A also comprises aeraulic means 6, which are capable, during operation, of creating an incoming gas stream F coming from the outside of the exchange enclosure 2, so that this incoming gas stream F is introduced into the volume of liquid V contained in the exchange enclosure 2, below the surface S of said volume of liquid, and an outgoing gas stream F' treated by direct contact with said volume of liquid rises up inside the exchange enclosure 2 and is discharged out of said exchange enclosure 2 by passing through the discharge opening 2b of the exchange enclosure 2.

In the particular example of FIG. 1, the aeraulic means 6 are capable, during operation, of creating by suction an incoming gas stream F coming from the outside of the exchange enclosure 2. In another variant, the aeraulic means 6 may be capable, during operation, of creating said incoming gas stream F by blowing.

In the particular example of FIG. 1, these aeraulic means 6 comprise a fan 60, whose intake 60a is connected to the discharge opening 2b of the exchange enclosure 2.

The fan 60 may be for example a centrifugal fan or any known type of gas compressor, such as an axial fan, a pump, etc.

The aeraulic means 6 also comprise injection means 61 for introducing the incoming gas stream F into the volume of liquid V contained in the exchange enclosure 2, below the surface S of said volume of liquid.

In the particular example of FIG. 1, these injection means 61 comprise a vertical injection conduit 610 positioned within the exchange enclosure 2, and comprising a gas stream intake opening 610a at the top and a gas stream discharge opening 610b at the bottom. The intake opening 610a communicates with a gas stream intake pipe 611 positioned outside the exchange enclosure 2. Said intake pipe comprises a gas stream intake opening 611a.

According to the application, this intake opening 611a may for example open into the open air or may be connected to any device or any facility in which the gas stream F is captured.

When the fan 60 is being operated, the inside of the exchange enclosure 2 is depressurized. When the fan 60 is operating, the pressure in the tub 3 outside the exchange enclosure 2 and above the liquid bath L is equal to the pressure $P_{in}$ in the incoming gas stream F at the inlet of the injection conduit 610, because of the sealed closure of the tub 3. This pressure $P_{in}$ is greater than the pressure $P_{out}$ above the volume of liquid in the exchange enclosure 2.

This pressure difference $\Delta P$ ($\Delta P = P_{in} - P_{out}$) in the exchange enclosure 2 (FIG. 4) results in a rise in the level (FIG. 1/height h) of the liquid in the exchange enclosure 2 and a decrease in the level of liquid (FIG. 1/height H) in the tub 3 outside the exchange enclosure 2.

The volume of liquid V and the level h of liquid in the exchange enclosure 2 depends on this pressure difference $\Delta P$.

When the fan 60 is operating, it sucks up an incoming gas stream F which enters the injection conduit 610 of the exchange enclosure 2 through the intake opening 610a of this conduit 610. This incoming gas stream F (untreated) is introduced into the non-submerged part of the injection conduit 610, passes through the discharge opening 610b of the submerged bottom of the injection conduit 610 and is introduced into the volume of liquid V contained in the submerged bottom of the enclosure 2, below the surface S of said volume of liquid. An outgoing gas stream F', treated by direct contact with said volume of liquid contained in the exchange enclosure 2, rises up inside the exchange enclosure 2, outside the injection conduit 610 and is discharged out of said exchange enclosure by passing through the discharge opening 2b of the enclosure. This outgoing gas stream F' is sucked up by the fan 60 and discharged in the form of a gas stream F" (FIG. 1).

Depending on the application, the air outlet 60b of this fan 60 may for example open into the open air or may be connected to a pipe (not shown) so that the air stream F" is sent to another device or another facility and is not released into the open air.

When the temperature of the volume of liquid V in the enclosure 2 is different from the temperature of the gas stream F prior to its introduction into the volume V of liquid, heat exchanges occur between the gas and the liquid by sensible heat and latent heat.

When the temperature $T_{Liquid}$ of the volume of liquid is less than the initial temperature $T_{initial}$ of the gas stream F before its introduction into the volume of liquid, the gas stream F' is cooled. More particularly, the temperature of the outgoing gas stream F' has been decreased and may, for example, be substantially equal to the temperature $T_{Liquid}$ of the volume of liquid. It follows necessarily that the outgoing gas stream F' from the device 1A has been dehumidified with respect to the incoming gas stream F, the absolute humidity (weight of water per volume of air) in the outgoing gas stream F' being lower than the absolute humidity of the incoming gas stream F.

Conversely, when the temperature $T_{Liquid}$ of the volume of liquid is greater than the initial temperature $T_{initial}$, the outgoing gas stream F' is heated and may for example be at a temperature substantially equal to the temperature $T_{Liquid}$ of the volume of liquid. It follows necessarily that the outgoing gas stream F' from the device 1A has been humidified with respect to the incoming gas stream F, the absolute humidity (weight of water per volume of air) in the outgoing gas stream F' being greater than the absolute humidity of the incoming gas stream F.

In some applications, the device 1A can be used to filter or clean up the incoming gas stream F by passing said stream through a volume of liquid V. The device 1A can also be used to condense or evaporate one or more compounds transported by the incoming gas stream F, by passing said stream through a volume of liquid V. Depending on the application, the temperature of the volume of liquid may be higher or lower than the temperature of the incoming gas stream F, or be substantially equal to the temperature of the incoming gas stream F. When the temperature of the volume of liquid is substantially equal to the temperature of the incoming gas stream F, an outgoing gas stream F' is produced at the outlet of the device 1A that has not been heated or cooled, but is substantially at the same temperature as the incoming gas stream F.

In the variant in FIG. 1, the fan 60 makes it possible to create the gas streams F and F' by suction. In another variant, the fan 60 may be connected to the intake opening 610a of the injection conduit 610, so as to create these gas streams F and F' by blowing and not by suction.

Referring to FIG. 1, the device 1A comprises first means 7 for measuring a first operating parameter $X_{out}$ measured in the outgoing gas stream F', and in this case in the exchange enclosure 2 above the volume of liquid L.

The device 1A further comprises second means 8 for measuring a second operating parameter $X_{in}$ measured in the incoming gas stream F', and in this case in the intake pipe 611 near the intake opening 610a of the injection conduit 610.

The device 1A also comprises electronic control means 9 which are capable, during operation of the device, of automatically controlling the supply means 4 and the discharge means 5 so as to automatically adjust the height h of liquid (or in other words the level of liquid) in the exchange enclosure 2, generally depending on at least said first operating parameter $X_{out}$ and for example at least one set value $X_C$.

More specifically, the electronic control means 9 are capable of automatically controlling the supply means 4 and the discharge means 5 to automatically adjust the height h of liquid in the exchange enclosure 2 depending also on the second operating parameter $X_{in}$, and preferably depending on the difference $X_{out} - X_{in}$ (in absolute value or in algebraic value).

For example, when $X_{out}$ is greater than $X_C$, or when the difference $X_{out} - X_{in}$ (in absolute value) is greater than $X_C$, the electronic control means 9 automatically control the supply means 4 so as to increase the level of liquid h in the exchange enclosure 2. Conversely, when $X_{out}$ is less than $X_C$, or when the difference $X_{out}$-$X_{in}$ (in absolute value) is less than $X_C$, the electronic control means 9 automatically control the discharge means 5 in such a way as to reduce the level of liquid h in the exchange enclosure 2.

In many applications, the pressure $P_{in}$ in the gas stream F at the inlet of the exchange enclosure 2 and/or the pressure $P_{out}$ in the gas stream F' at the exchange enclosure outlet 2 may vary in an uncontrolled manner, which in the absence of control means 9 automatically causes a variation in the height h of liquid in the exchange enclosure 2 compensating for this variation in pressure. This variation of the liquid height causes a change in the operating point of the device, the exchange between the gas stream and the volume of liquid in the exchange enclosure being detrimentally modified in an uncontrolled manner. Likewise in some applications, even if the pressure $P_{in}$ in the gas stream at the inlet of the exchange enclosure 2 and the pressure $P_{out}$ of the gas stream at the exchange enclosure outlet 2 are constant over time, it may be useful to be able to vary the operating point of the device, and thus to be able to vary the level of exchange between the gas stream and the volume of liquid, for example to make it optimal.

Thus, in a first embodiment, the first operating parameter $X_{out}$ may be the pressure $P_{out}$ ($X_{out}=P_{out}$) in the treated gas stream F' and the second operating parameter $X_{in}$ may be the pressure $P_{in}$ ($X_{in}=P_{in}$) in the incoming gas stream F, the first 7 and second 8 measuring means being Pitot probes, for example.

By automatically adjusting the height h of liquid in the exchange enclosure 2 depending on the pressure $P_{out}$, and more particularly the pressure difference $P_{out}$-$P_{in}$, it is ensured that the operating point of the facility, and therefore the quality of the exchange between the incoming air stream F and the liquid in the enclosure 2, is always correct, regardless of $P_{in}$ and $P_{out}$ pressure.

In a second variant, the first operating parameter $X_{out}$ may be the temperature $T_{out}$ ($X_{out}=T_{out}$) measured in the treated gas stream F' and the second operating parameter $X_{in}$ may be the temperature $T_{in}$ ($X_{in}=T_{in}$) measured in the incoming gas stream F, the first 7 and second 8 measuring means being in this case temperature probes.

In a third variant, the first operating parameter $X_{out}$ may be the concentration $C_{out}$ ($X_{out}=C_{out}$) of a (chemical or particulate) component measured in the treated gas stream F' and the second operating parameter $X_{in}$ may be the concentration $C_{in}$ ($X_{in}=C_{in}$) of this component measured in the incoming gas stream F, the first 7 and second 8 measuring means being in this case probes for detecting this component.

By way of a non-limiting and non-exhaustive example in the case of the treatment of gas streams composed of combustion fumes, in particular industrial fumes, the chemical component may be nitrogen oxides (NOx), the volume of liquid in the exchange enclosure being used to capture these nitrogen oxides. In other applications, the chemical compounds captured in the liquid may be selected in a non-limiting and non-exhaustive manner from the following list: VOCs (volatile organic compounds), SOx, PAH (polycyclic aromatic hydrocarbons), CO, $CO_2$, $NH_3$, and chloramines.

Figure 2:
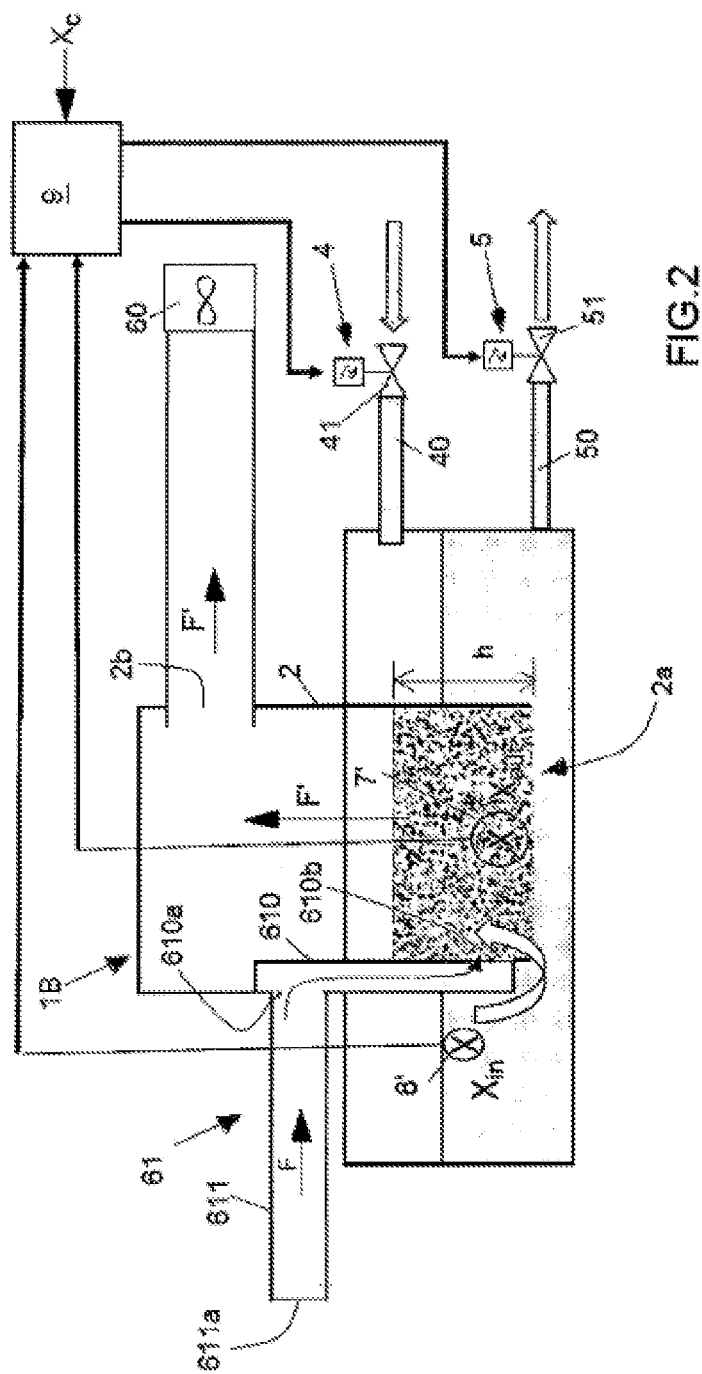
FIG. 2 is a schematic representation of a second device according to the invention.

FIG. 2 shows another device 1B of the invention, which differs from the device 1A of FIG. 1 by the use of:

first means 7' for measuring a first operating parameter ($X_{out}$) measured in the liquid contained in the exchange enclosure 2;

second means 8' for measuring a second operating parameter ($X_{in}$) measured in the liquid contained in the tub 3 outside the exchange enclosure 2.

In another variant, the first operating parameter ($X_{out}$) may be measured in the liquid coming from the exchange enclosure 2.

In another variant, the second operating parameter ($X_{in}$) may be measured in the new liquid before its introduction into the tub 3, and thus before its introduction into the exchange enclosure 2, for example by being measured in the supply conduit 40 upstream or downstream of the valve 41.

In the context of the invention, this first operating parameter ($X_{out}$) may be the concentration ($CL_{out}$) of a compound in the liquid contained in the exchange enclosure 2 and the second parameter may be the concentration ($CL_{in}$) of this compound in the liquid outside the exchange enclosure 2.

In the context of the invention, this first operating parameter ($X_{out}$) may be the pH ($pH_{out}$) of the liquid contained in the exchange enclosure 2 and the second parameter may be the pH ($pH_{in}$) of the liquid outside the exchange enclosure 2, the first 7' and second 8' measuring means being in this case pH measuring probes.

In an improved variant of the invention, in addition to adjusting the height h of liquid in the exchange enclosure 2, the electronic control means 9 can also be designed, and for example be programmed, to automatically control the valves 41 and 51 so as to allow a continuous or discontinuous renewal of the liquid in the exchange enclosure 2, preferably during operation of the device, depending on a parameter measured in the liquid of the exchange enclosure 2 or coming from the exchange enclosure 2 and/or on a parameter measured in the new liquid before its introduction into the exchange enclosure 2, such as the pH of the liquid and/or the concentration of a compound in the liquid and/or the temperature of the liquid, and/or depending on a parameter measured in the incoming gas stream (F) and/or on a parameter measured in the outgoing gas stream (F'), such as in particular the temperature of the gas stream or the concentration of a component in the gas stream.

The invention claimed is:

1. An apparatus for producing and treating a gas stream (F), the apparatus comprising an exchange enclosure (2) having at least one first discharge opening (2b) for discharging a gas stream, a liquid supply conduit (40) for supplying the exchange enclosure (2) with a liquid (L) such that the exchange enclosure (2) can contain a volume (V) of this liquid with said first discharge opening (2b) of the exchange enclosure being positioned above the surface (S) of the volume of liquid (V) contained in the exchange enclosure, and a discharge conduit (50) for discharging the liquid (L) contained in the exchange enclosure (2) and an aeraulic device (6), which is capable, during operation, of creating, by suction or blowing, an incoming gas stream (F) coming from the outside of the exchange enclosure (2), such that this incoming gas stream (F) is introduced into the volume of liquid (V) contained in the exchange enclosure (2), below the surface (S) of said volume of liquid, and such that an outgoing gas stream (F') treated by direct contact with said volume of liquid rises up inside the exchange enclosure and is discharged out of said exchange enclosure (2) by passing through the at least one first discharge opening (2b) of the exchange enclosure (2), wherein said apparatus further comprises a measuring device (7) for measuring a first operating parameter ($X_{out}$) measured in the outgoing gas stream (F') and said apparatus comprises an electronic control unit for automatically controlling a liquid supply into the exchange enclosure through the supply conduit (40) and for automatically controlling a liquid discharge out of the exchange enclosure through the discharge conduit (50) so as to automatically adjust the height (h) of liquid in the exchange enclosure depending on at least this first operating parameter ($X_{out}$).

2. The apparatus according to claim 1, wherein the first operating parameter ($X_{out}$) is a pressure ($P_{out}$) measured in the exchange enclosure (2) above the volume of liquid.

3. The apparatus according to claim 1, wherein the first operating parameter ($X_{out}$) is a temperature ($T_{out}$) of the outgoing gas stream (F').

4. The apparatus according to claim 1, wherein the first operating parameter ($X_{out}$) is a concentration ($C_{out}$) of a component in the outgoing gas stream (F').

5. The apparatus according to claim 1, further comprising a second measuring device (8) for measuring a second operating parameter ($X_{in}$) in the incoming gas stream (F), and wherein the electronic control unit (9) is capable of automatically controlling said liquid supply and said liquid discharge so as to automatically adjust the height (h) of liquid in the exchange enclosure (2) depending also on this second operating parameter ($X_{in}$).

6. The apparatus according to claim 5, wherein the second operating parameter ($X_{in}$) is a pressure ($P_{in}$) measured in the incoming gas stream (F).

7. The apparatus according to claim 5, wherein the second operating parameter ($X_{in}$) is a temperature ($T_{in}$) of the incoming gas stream (F).

8. The apparatus according to claim 5, wherein the second operating parameter ($X_{in}$) is a concentration ($C_{in}$) of a component in the incoming gas stream (F).

9. The apparatus according to claim 5, wherein the electronic control unit (9) is capable of automatically controlling said liquid supply and said liquid discharge depending on the difference between the first operating parameter ($X_{out}$) and the second operating parameter ($X_{in}$).

10. The apparatus according to claim 1, wherein the liquid supply conduit (40) of the exchange enclosure (2) comprises a supply tub (3) of liquid (L), and the bottom of the exchange enclosure (2) comprises at least one liquid intake opening (2a) and is submerged in the tub (3).

11. The apparatus according to claim 10, wherein the tub (3) of liquid is sealed such that a pressure ($P_{in}$) in the tub (3) above the liquid is equal to a pressure in the incoming gas stream (F).

12. The apparatus according to claim 1, further comprising a submerged measuring device (7') for measuring a third operating parameter in the liquid contained in the exchange enclosure (2) or coming from the exchange enclosure (2), and wherein the electronic control unit is also adapted for automatically controlling said liquid supply and for automatically controlling said liquid discharge so as to automatically adjust the height (h) of liquid in the exchange enclosure depending also on this third operating parameter.

13. The apparatus according to claim 12, wherein the third operating parameter is a concentration ($CL_{in}$) of a compound in the liquid outside the exchange enclosure (2).

14. The apparatus according to claim 12, wherein the third operating parameter is a pH ($pH_{in}$) of the liquid outside the exchange enclosure (2).

15. The apparatus according to claim 14, wherein the third operating parameter ($X_{in}$) is a pH ($pH_{in}$) of the liquid before its introduction into the exchange enclosure (2).

* * * * *